Sept. 23, 1958  KOREYOSHI UEMURA  2,853,311
SPLASH-BOARD APPARATUS FOR VEHICLE FENDERS
Filed Nov. 20, 1956  2 Sheets-Sheet 1

Sept. 23, 1958  KOREYOSHI UEMURA  2,853,311
SPLASH-BOARD APPARATUS FOR VEHICLE FENDERS
Filed Nov. 20, 1956  2 Sheets-Sheet 2
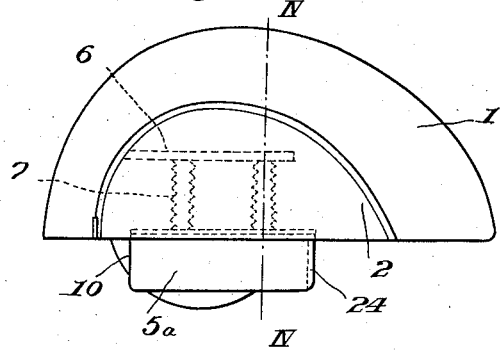
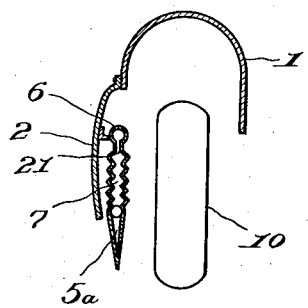
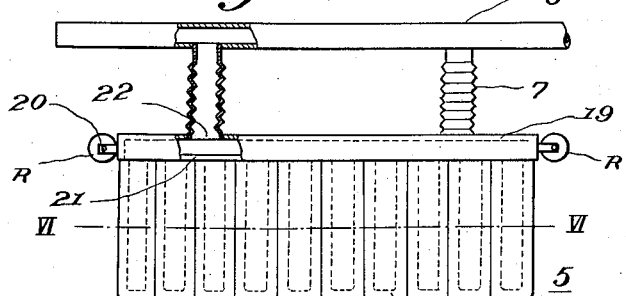
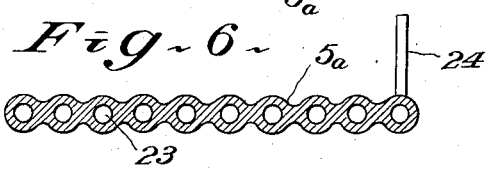
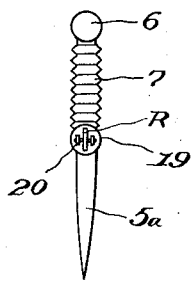
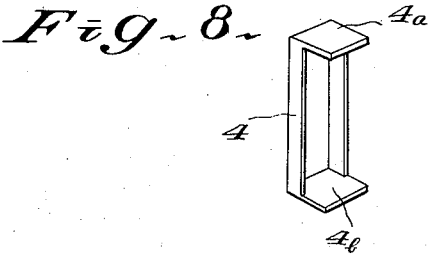

United States Patent Office 2,853,311
Patented Sept. 23, 1958

2,853,311

SPLASH-BOARD APPARATUS FOR VEHICLE FENDERS

Koreyoshi Uemura, Matsuura-shi, Nagasaki-ken, Japan

Application November 20, 1956, Serial No. 623,453

Claims priority, application Japan November 21, 1955

3 Claims. (Cl. 280—153)

The present invention relates to a new and useful fender skirt construction for a motor car and has for one of its important objects to provide, in a manner as hereinafter set forth, a fender skirt construction which is adapted to be easily and detachably attached to a fender of a motor car and which is very effective for checking mud or water splashings.

Another object of this invention is to provide a new and useful fender skirt arrangement which will be comparatively simple in construction, strong, durable, compact, light in weight, attractive in appearance and which may be manufactured at low cost.

The novel features which are believed to be characteristics of the present invention are set forth with particularity in the appended claims, the present invention itself, however, both as to its operation and construction, together with further objects and advantages thereof, may best be understood by reference to the following description taken in connection with the accompanying drawings, wherein the same numerals and letters refer to the same parts throughout and in which:

Fig. 3 is a side view of the fender skirt construction illustrated in Fig. 2 and which is attached to the fender in closed position, showing the splash-board in lowered position.

Fig. 4 is a sectional view, taken substantially along the line IV—IV of Fig. 3.

Fig. 5 is an enlarged side view, partly in section, of the splash-board unit extension illustrated in Fig. 2.

Fig. 6 is a cross-sectional view, taken along the line VI—VI in Fig. 5.

Fig. 7 is a front view of the splash-board element shown in Fig. 5.

Fig. 8 is an enlarged perspective view of the channel-shaped track shown in Fig. 2.

Figure 1:
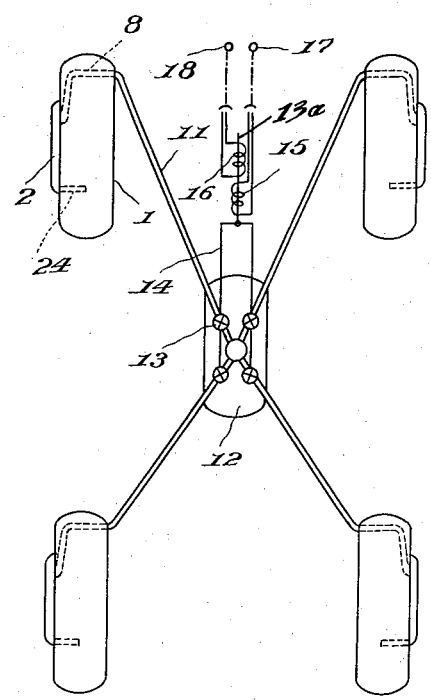
Fig. 1 is a schematic plan view showing fenders to which the device of this invention is attached.
Figure 2:
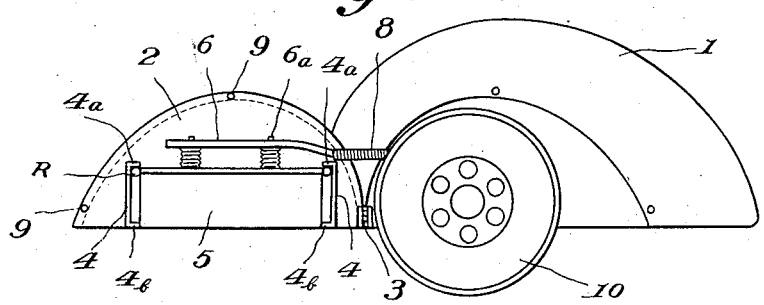
Fig. 2 is a side view of a fender skirt constructed in accordance with the present invention, showing the hinged fender skirt in open position.

Referring to the drawings, it will be seen that the embodiment of the present invention which has been illustrated comprises a fender skirt 2 which is provided with holes 9 for insertion of a screw bolt to connect the fender 1 and 2 and the skirt is hinged on the fender 1, as at 3, right and left channel-shaped tracks 4 attached to said fender skirt at its inside surface, said tracks being shown in detail in Fig. 8 and being provided with upper and lower stops 4a and 4b, a splash-board unit 5 which is provided with rollers R on its two sides and supported to be moved up and down along said tracks by said rollers R, a pipe 6 attached to the fender skirt 2 on its inside surface by a suitable means such as supporting arms 6a, and one or more extendible bellows pipes 7 (the illustration shows two pipes) which are suspended from pipe 6 and which support the splash-board unit 5, the interior of the pipe 6 communicating in air-tight relationship with the hollow holes 23 in the splash-board unit extension 5a by means of the bellows pipes 7, said hollow holes being described in detail in connection with Figs. 5 and 6.

By means of a flexible pipe 8 and a pipe 11, the pipe 6 is connected with a compressed air tank 12 which is positioned under the car body as clearly shown in Fig. 1. In pipe 11 is inserted a valve 13 which in turn is coupled by means of a linkage 14 with a core 13a extending through magnetic coil 15 for moving the valve 13 into its open position and through a magnetic coil 16 for moving the valve 13 into its closed position. The valve 13 is so formed that when it is moved into a closed position, the pipe 11 will communicate with the atmosphere. The circuits of the magnetic coils 15 and 16 are, respectively, provided with push buttons 17 and 18 for closing these circuits. Instead of using two coils 15 and 16, only one magnetic coil and one push button may be used for opening and closing the valve 13. In this case, a spring which normally maintains the linkage 14 in its position for closing the valve 13 should be connected to the linkage 14.

Referring to Figs. 4 to 7, the splash-board unit 5 is composed of a pipe 19 and a wave-shaped bag or extension 5a which is made of any suitable material such as rubber, plastic material, vinyl and canvas and is air-tightly attached downwards to pipe 19, said pipe being provided with a longitudinal slot 21 at its under portion, upper openings 22 communicating with the interiors of the bellows pipes 7, and lug pieces 20 for supporting the rollers R at both end portions, and bag 5a being provided with a plurality of hollow holes 23 which communicate with the slot 21 of the pipe 19 at their upper ends. The transverse plate 24 attached to the splash-board 5 is used to check rearward splash.

Operation of the above-mentioned embodiment is as follows:

When the push button 17 is pushed to excite the magnetic coil 15, the valve 13 is opened and compressed air is supplied to the bellows pipes 7 and the hollow holes 23 of the bag by means of the pipe 11, flexible pipe 8, and pipe 6 from the compressed air tank 12. Then, the pipes 7 elongate and push the bag 5a downwards to the position shown in Fig. 3, whereby the splashing of mud and water will be effectively checked.

Next, when the push button 18 is pushed to excite the magnetic coil 16, the valve 13 is closed and the pipe 11 communicates with the atmosphere, whereby the compressed air in the bellows 7 and bag 5a escapes and the bellows 7 contracts due to its elastic force, so that the bag 5a is restored to its upper position.

The above-mentioned upward and downward movement of the bag 5a can be smoothly carried out as the rollers R roll along the channel-shaped tracks 4. Furthermore, when the hollow holes 23 of the bag 5a are filled with compressed air, the bag stretches to a substantial extent, so that it can not be bent by the material splashing against it, which results in effective operation.

The foregoing is considered as illustrative only of the principle of the invention. Further, since numerous modifications and changes will readily occur to those skilled in the art, it is not desired to limit the invention to the exact construction and operation shown and described, and accordingly, all suitable modifications and changes may be resorted to, falling within the scope of the invention as claimed.

What is claimed is as follows:

1. A fender skirt construction for a motor car having a fender which comprises, in combination, a fender skirt hinged to the fender, an air feeding pipe secured to the inner surface of said skirt, at least one extensible bellows pipe suspended from said feeding pipe, a splash-board unit supported and depending from the lower end portion of said bellows pipe, said feeding pipe and said bellows pipe being hollow and in fluid communicating relationship whereby when a compressed fluid medium is supplied to the feeding pipe, the bellows pipe will extend downwardly to push the splash-board unit downwardly, means for guiding the vertical movements of said splash-board, and means for supplying the feeding pipe with compressed air and for exhausting the compressed air from said pipe.

2. A fender skirt construction for a motor car having a fender which comprises, in combination, a fender skirt hinged to the fender, an air feeding pipe secured to the inner surface of said skirt, at least one extensible bellows pipe suspended from said feeding pipe, a splash-board unit supported and depending from the lower end portion of said bellows pipe, said feeding pipe and said bellows pipe being hollow and in fluid communicating relationship whereby when a compressed fluid medium is supplied to the feeding pipe, the bellows pipe will extend downwardly to push the splash-board unit downwardly, means for guiding the vertical movements of said splash-board, and means for supplying the feeding pipe with compressed air and for exhausting the compressed air from said pipe, said guiding means comprising vertical channel-shaped tracks attached to the inside of the fender skirt along both end edges thereof and rollers supported by the splash-board unit and engaged with said tracks, said splash-board unit being defined by a hollow top portion in fluid-communicating relationship with the bellows pipe, and a bag member attached to said top portion and provided with a plurality of vertical hollow chambers communicating at their upper ends with said top portion.

3. A fender skirt construction for a motor car having a fender which comprises, in combination, a fender skirt which is hinged to the fender, an air feeding pipe secured to the inner surface of said skirt, a plurality of extensible bellows pipes suspended from said feeding pipe, a splash-board unit supported and depending from the lower end portions of said bellows pipes, said feeding pipe and said bellows pipes being hollow and in fluid communicating relationship so that when a compressed fluid medium is supplied to the feeding pipe, the bellows pipes will extend downwards to push the splash-board downwardly, means for guiding the up and down movement of said splash-board, and means for supplying the feeding pipe with compressed air and for exhausting the compressed air from said pipe, said splash-board unit being defined by a hollow top portion in fluid-communicating relationship with the bellows pipes and a bag member attached to said top portion and provided with a plurality of vertical hollow chambers communicating at their upper ends with said top portion.

References Cited in the file of this patent

FOREIGN PATENTS 346,577     Great Britain _____ Apr. 16, 1931